(12) United States Patent
Chung (10) Patent No.: US 9,307,051 B2
(45) Date of Patent: Apr. 5, 2016

(54) SELECTING CONFIGURATIONS FOR PRESENTATION OF STORY UNITS TO SOCIAL NETWORKING SYSTEM USERS

(71) Applicant: Facebook, Inc., Menlo Park, CA (US)

(72) Inventor: Sophia Chung, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 332 days.

(21) Appl. No.: 13/747,301

(22) Filed: Jan. 22, 2013

(65) Prior Publication Data

US 2014/0208231 A1  Jul. 24, 2014

(51) Int. Cl.
*H04L 29/08* (2006.01)
*G06Q 50/00* (2012.01)

(52) U.S. Cl.
CPC ............... *H04L 67/36* (2013.01); *G06Q 50/01* (2013.01); *H04L 67/12* (2013.01); *H04L 67/22* (2013.01); *H04L 67/306* (2013.01)

(58) Field of Classification Search
CPC .......... G06F 17/30905; G06F 17/3089; G06Q 30/02; G06Q 30/0243; G06Q 30/0242; G06Q 50/01; H04L 67/22
See application file for complete search history.

(56) References Cited

U.S. PATENT DOCUMENTS

| | | | | |
|---|---|---|---|---|
| 8,612,375 | B2 * | 12/2013 | Weinstein et al. | 706/47 |
| 8,764,561 | B1 * | 7/2014 | Lan et al. | 463/31 |
| 2007/0174389 | A1 * | 7/2007 | Armstrong et al. | 709/204 |
| 2008/0040370 | A1 * | 2/2008 | Bosworth et al. | 707/101 |
| 2008/0040474 | A1 * | 2/2008 | Zuckerberg et al. | 709/224 |
| 2009/0282343 | A1 * | 11/2009 | Catlin et al. | 715/738 |
| 2010/0064281 | A1 * | 3/2010 | Kimball et al. | 717/124 |

OTHER PUBLICATIONS

Alt et al. "A/B Split Testing". Brief posted Aug. 16, 2005 at Marketing Experiments. Retrieved from <http://marketingexperiments.com> on <Jan. 31, 2015>.*
Kohavi et al. "Practical Guide to Controlled Experiments on the Web: Listen to Your Customers not to the HiPPO." KDD'07, Aug. 12-15, 2007, San Jose, California, USA. Retrived from <http://exp-platform.com/hippo.aspx> on <Jan. 31, 2015>.*
Chopra, Paras. "The Ultimate Guide to A/B Testing." Web published on Jun. 24, 2010 at Smashing Magazine. Retrieved from <http://www.smashingmagazine.com> on <Feb. 1, 2015>.*
Goward, Chris. "30 Reasons to Use AB Split Testing for Conversion Optimization" blog entry posted May 1, 2011 at The Marketing Optimization Blog. Retrieved from <http://www.widerfunnel.com> via the Internet Archive on <Feb. 1, 2015>.*

* cited by examiner

*Primary Examiner* — Amy M Levy
(74) *Attorney, Agent, or Firm* — Fenwick & West LLP (57) ABSTRACT

A social networking system selects a configuration for presenting a story unit describing one or more actions performed by one or more social networking system users. In particular, story units having a particular type are presented to social networking system users using different configurations. Interactions between the social networking system users and the story units presented using the different configurations are captured and analyzed. Based on the analysis, a configuration is selected and used for subsequently presented story units having the same particular type.

14 Claims, 3 Drawing Sheets

SELECTING CONFIGURATIONS FOR PRESENTATION OF STORY UNITS TO SOCIAL NETWORKING SYSTEM USERS

BACKGROUND

This invention generally relates to social networking systems, and more specifically to automatically selecting a configuration for a story unit.

Social networking systems have become prevalent in recent years and allow their users to connect and communicate with other users. Frequently, social networking systems provide a user with information describing actions performed by other users to which the user is connected. For example, a social networking system may automatically provide a user with a story indicating that another user connected to the user has read a particular news article or played a particular video game. The user provided with the story may comment on the story, express a preference for the story, share the story with additional users, or perform other interactions with the story.

In some instances, social networking systems may group similar stories together to provide information to users in a more organized manner. However, conventional social networking systems do not structure such similar stories for presentation in an intelligent manner, which adversely impacts communications over and usage of the social networking systems.

SUMMARY

A social networking system automatically selects configurations for story units in order to more efficiently communicate and encourage interaction with the story units. A "story" is a communication provided to a particular user of a social networking system (a "viewing user") describing an action performed by another user. For example, a story describes an action performed by an additional social networking system user, who is connected to the viewing user, on an object (e.g., a news article, a digital photograph, etc.). The action described by a story may be performed within the social networking system or external to the social networking system. A "story unit" is a grouping of one or more stories having one or more similar characteristics. For example, a story unit includes multiple stories describing the same type of action performed by a particular user on different objects. In one aspect, presenting a story unit to a viewing user allows the user to view and/or interact with the various stories that comprise the story unit.

In one embodiment, a social networking system determines a default configuration for types of story units. In particular, the social networking system may determine a default layout, structure, organization, or formatting for a particular type of story unit. In one implementation, a story unit's type may be based on the type of action described by the story unit. For example, the stories included in a story unit may variously describe "read" type actions, so the story unit is determined to have a "read" type. In another implementation, the type of a story unit is based on an external system associated with the type of action described by the story unit. In one aspect, the external system may have defined the type of action, and enabled users to perform actions having the type over the external system. For example, an external third party website may be associated with "pin" type user actions, so a story unit including stories describing "pin" type actions performed over the third party website has a type associated with the third party website.

To determine a default configuration for a type of story unit, the social networking system performs A-B testing, a two-sample hypothesis testing, with respect to the type of story unit. In particular, the social networking system presents story units having the type in an initial configuration to a set of users. The social networking system also presents story units having the type in an alternative configuration to an additional set of users. After presentation of the story units having the type to the set of users and to the additional set of users, the social networking system captures and analyzes user interactions with the story units from each of the set of users and the additional set of users. For example, the social networking system determines a number of users in each of the set of users and in the additional set of users that have expressed a preference for (e.g., "liked"), commented on, or otherwise interacted with the story units. The social networking system then compares the interactions of the set of users with the interactions of the additional set of users. For example, the social networking system compares the number of users in the set of users that expressed preference for the story units presented via the initial configuration with the number of users in the additional set of users that expressed preference for the story units presented via the alternative configuration. Based on the comparison, the social networking system selects a default configuration for subsequently presented story units of the type. For example, if a greater number of users in the set of users interacted with the story units presented via the initial configuration than users in the additional set of users that interacted with the story units presented via the alternative configuration, subsequent story units having the same type are presented using the initial configuration.

Selecting configurations in the manner described allows a social networking system to more effectively communicate story units to users. The social networking system may furthermore present story units in ways that encourage user interaction with the story units. This may increase usage of the social networking system, and lead to enhanced experiences for users.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system allows its users to communicate and interact with other users. In use, a user registers for an account to join the social networking system, which thereafter reliably identifies the user based on the user account. The social networking system stores information related to each user as part of a user profile. Examples of information stored by a user profile include: gender, age, geographical region, stated interests or preferences, professional, personal, or educational affiliations, income, other suitable demographic information, or any other suitable information about the user. The user profile may also be associated with historical information describing the activities of the user internal to and/or external to the social networking system. For example, the user profile is associated with information regarding content accessed by the user via the social networking system, search queries provided by the user to the social networking system, content for which the user has expressed a preference via the social networking system (i.e., content the user "liked"), content shared by the user via the social networking system, interactions with advertisements by the user, groups joined by the user, events attended by the user, check-ins to locations by the user, products purchased by the user, or other information describing actions performed by the user.

The user profile may also include and/or be associated with information indicating connections between the user and additional users of the social networking system (e.g., friends, family members, etc.). For example, a user accepts a request from another user of the social networking system to establish a connection with the user. After the user accepts the request, the social networking system stores information identifying the other user connected to the user.

In one embodiment, a social networking system presents one or more stories to its users. The stories may be presented via pages, user profiles, newsfeeds, streams of data, or any other suitable communication channel. A story is a communication to a user ("a viewing user") describing an action performed by an additional user connected to the viewing user. The story may also identify one or more objects on which the described action was performed. For example, if a viewing user is connected to an additional user that has expressed a preference for ("liked") a company's page, a story is provided to the viewing user identifying the additional user and that the additional user "liked" the company's page. An action described by a story may be performed internal to the social networking system or external to the social networking system. The social networking system may group one or more stories having a similar attribute or characteristic into a "story unit," to simplify presentation of the stories to a viewing user. As further described herein, the social networking system may select a default configuration for presenting a story unit to a viewing user based at least in part on the type of actions described by stories in the story unit.

Figure 1:
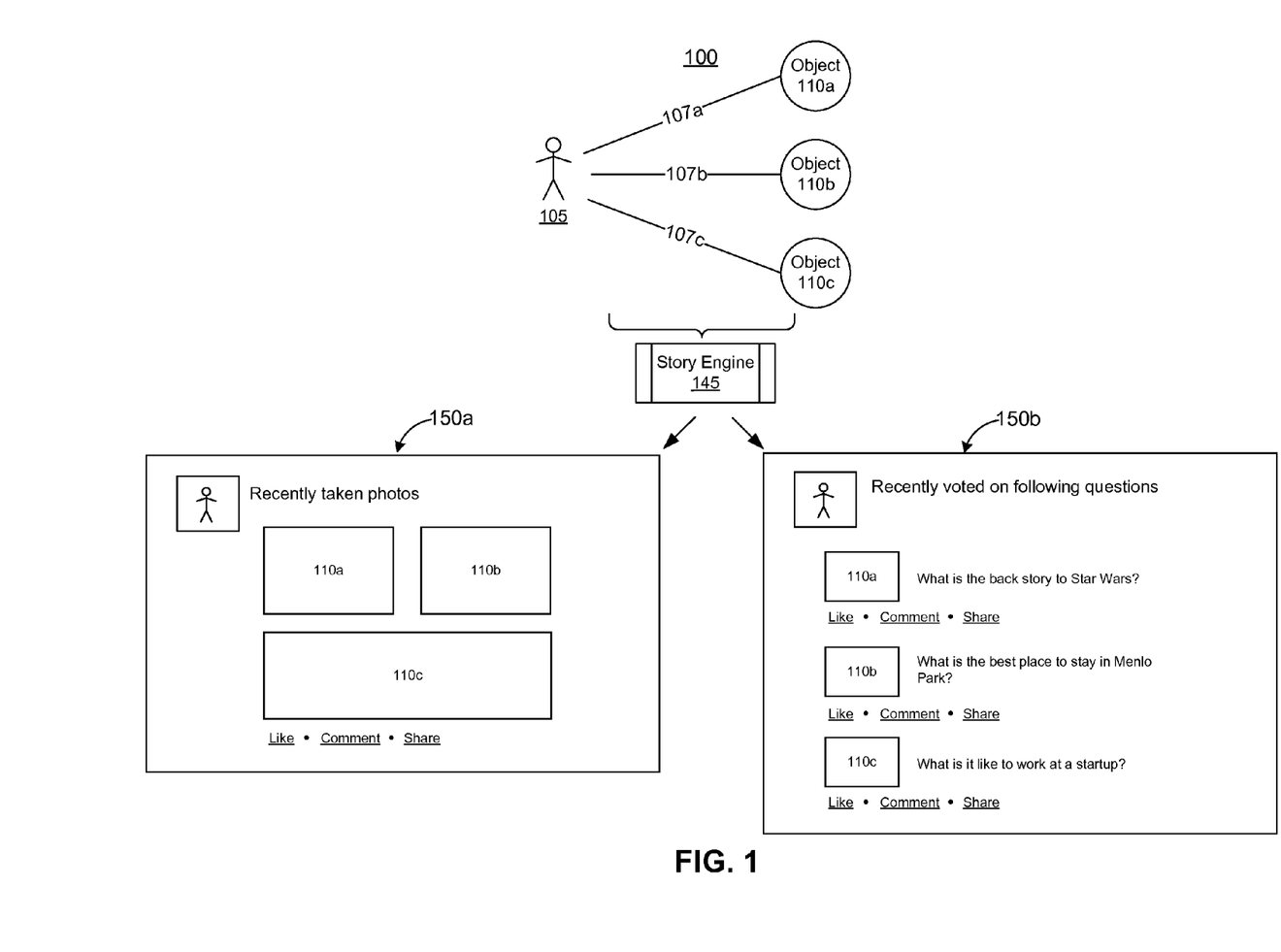
FIG. 1 is a block diagram of a process for selecting configurations for story units, in accordance with an embodiment of the invention.

Referring to FIG. 1, a block diagram of one embodiment of a process for selecting configurations for story units in a social networking system 100 is shown. In the example of FIG. 1, a user 105 performs three separate actions 107a, 107b, 107c on various objects 110a, 110b, 110c. For purposes of illustration, the actions 107a, 107b, 107c and/or the objects 110a, 110b, 110c have one or more common or similar characteristics. For example, each of the actions 107a, 107b, and 107c may be a "reading" type action. Information describing the actions 107a, 107b, 107c and identifying the objects 110a, 110b, 110c is received by a story engine 145 of the social networking system 100, which generates a story unit 150 by grouping three stories describing the actions 107a, 107b, 107c performed by the user 105 on the objects 110a, 110b, and 110c.

The story engine 145 also selects a particular configuration or layout for the generated story unit 150. In one embodiment, the selected configuration is based on a particular type of the story unit 150 determined from the actions included in the stories describing the actions 107a, 107b, 107c, and on A-B testing results from prior presentation of story units having the same type as the type of the generated story unit 150. For example, different configurations of story units having the particular type may have been presented to different groups of users. Thereafter, a default configuration for presenting story units having the particular type is determined based on comparisons between the user interaction levels of the different groups of users with their respective story unit configurations. For example, the story engine 145 selects, as the default configuration for the particular type of story unit, the configuration associated with the greatest number of user interactions. Hence, the social networking system 100 formats the story unit 150 using the selected default configuration for the type of the story unit 150.

FIG. 1 shows examples of story units 150a and 150b having different types and presented using different configurations. As shown in FIG. 1, the story unit 150a presents stories describing actions where the user 105 has "taken" various digital photographs or images using an application associated with the social networking system 100. The story unit 150a presents its constituent stories in a "thumbnail" configuration. In the example thumbnail configuration shown in FIG. 1, the digital photographs included in the story unit 150a are arranged so they are vertically and horizontally adjacent to one another. Furthermore, text describing individual stories is combined so the digital photographs are prominently displayed to a viewing user.

In contrast, the story unit 150b presents stories describing actions where the user 105 has "voted" on particular questions posted over an external third party system associated with the social networking system 100. As shown in FIG. 1, the story unit 150b presents its constituent stories in a "list" configuration, where each entry in the list includes a representative image and text describing the object with which the user 105 has interacted. This configuration provides more textual description of the stories included in the story unit 150b to a viewing user.

System Architecture

Figure 2A:
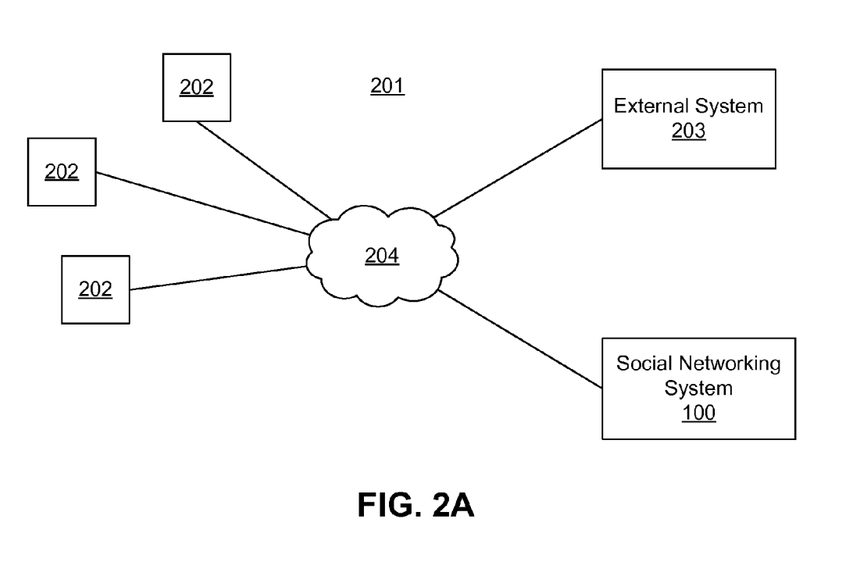
FIG. 2A is a block diagram of a system environment suitable for operation of a social networking system, in accordance with an embodiment of the invention.

FIG. 2A is a block diagram illustrating one embodiment of a system environment 201 including a social networking system 100. As shown in FIG. 2A, the system environment 201 includes one or more client devices 202, one or more external systems 203, the social networking system 100, and a network 204. While FIG. 2A shows three client devices 202 and one external system 203, it should be appreciated that any number of these entities (including millions) may be included. In alternative configurations, different and/or additional entities may also be included in the system environment 201.

A client device 202 is a computing device capable of receiving user input, as well as transmitting and/or receiving data via the network 204. Examples of client devices 202 include desktop computers, laptop computers, tablet computers (pads), mobile phones, personal digital assistants (PDAs), gaming devices, or any other device including computing functionality and data communication capabilities. Hence, the client devices 202 enable users to access the social networking system 100 and/or one or more external systems 203.

The client devices 202 also allow various users to communicate with one another via the social networking system 100.

The network 204 may be any wired or wireless local area network (LAN) and/or wide area network (WAN), such as an intranet, an extranet, or the Internet. The network 204 provides communication capabilities between one or more client devices 202, the social networking system 100, and/or one or more external systems 203. In various embodiments the network 204 uses standard communication technologies and/or protocols. Examples of technologies used by the network 204 include Ethernet, 802.11, 3G, 4G, 802.16, or any other suitable communication technology. The network 204 may use wireless, wired, or a combination of wireless and wired communication technologies. Examples of protocols used by the network 204 include transmission control protocol/Internet protocol (TCP/IP), hypertext transport protocol (HTTP), simple mail transfer protocol (SMTP), file transfer protocol (TCP), or any other suitable communication protocol.

The external system 203 is coupled to the network 204 to communicate with the social networking system 100 and/or with one or more client devices 202. The external system 203 provides content to one or more client devices 202 and/or to the social networking system 100. Examples of content provided by the external system 203 include web pages, news articles, multimedia content, audio data, video data, or other data. Interactions between social networking system users and content provided by an external system 203 may be captured and provided to the social networking system 100 through a social plug-in or other communication channel between the external system 203 and the social networking system 100. The social networking system users may specify one or more privacy settings to regulate or limit communication of their actions on the external system 203 to the social networking system 100. In one embodiment, types of user actions and/or types of objects are defined by an external system 203 and provided to the social networking system 100, allowing the external system 203 to define actions and/or objects logged by the social networking system 100.

Figure 2B:
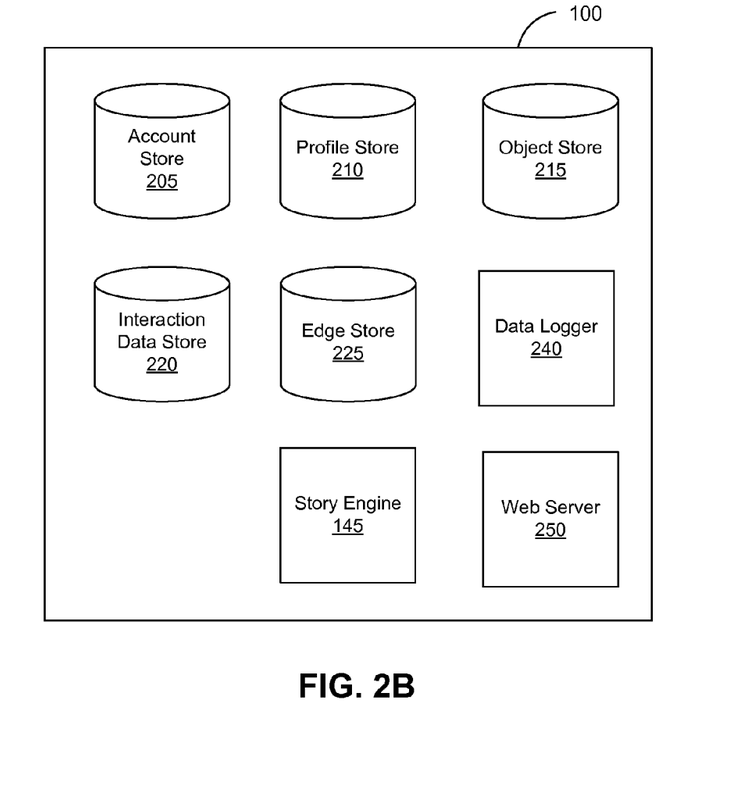
FIG. 2B is a block diagram of a social networking system, in accordance with an embodiment of the invention.

The social networking system 100, further described below in conjunction with FIG. 2B, is a computing system allowing its users to communicate, or to otherwise interact, with each other and to access content as described herein. In one embodiment, the social networking system 100 stores user accounts describing its users. User profiles are associated with the user accounts and include information describing the users. Using information in the user profiles, connections between user profiles, and actions associated with the user profiles, the social networking system 100 maintains a social graph of nodes interconnected by edges. Each node in the social graph represents an object that may act on and/or be acted upon by another object. Examples of objects represented by nodes include users, non-person entities, content items, groups, events, locations, messages, concepts, and any other suitable information. An edge between two nodes in the social graph represents a particular kind of connection between the two nodes. For example, an edge corresponds to an action performed by an object represented by a node on another object represented by another node.

FIG. 2B is a block diagram of one embodiment of the social networking system 100. In the embodiment shown by FIG. 2B, the social networking system 100 includes an account store 205, a profile store 210, an object store 215, an interaction data store 220, an edge store 225, a data logger 240, a web server 250, and the story engine 145. In alternative configurations, different and/or additional components can be included in the social networking system 100.

The account store 205 stores information describing a user account associated with each social networking system user. The information describing a user account may include a user identifier, a username, a user password, one or more user settings (e.g., user privacy settings), identifiers of client devices 202 associated with a user, or other suitable information. Data included in the account store 205 may be encrypted or otherwise secured to prevent unauthorized access to the data.

Each user account is associated with a corresponding user profile, which is stored in the profile store 210. A user profile includes declarative information about the user that was explicitly shared by the user and may also include profile information inferred by the social networking system 100. In one embodiment, a user profile includes multiple data fields, with each data field describing one or more attributes of the corresponding user of the social networking system 100. The information in a user profile describes a user corresponding to the user profile. Examples of information in a user profile include biographic information, demographic information, and other types of descriptive information, such as work experience, educational history, gender, hobbies or preferences, location, and the like. A user profile may also maintain references to actions by a user on objects and/or connections to other users.

While user profiles in the profile store 210 are frequently associated with individuals, allowing users to interact with each other via the social networking system 100, user profiles may also be stored for entities such as businesses or organizations. This allows an entity to establish a presence on the social networking system 100 for connecting and exchanging content with other social networking system users. The entity may post information about itself, about its products or provide other information to users of the social networking system 100 using a brand page associated with the entity's user profile. Other users of the social networking 100 system may connect to the brand page to receive information posted to the brand page or to receive information from the brand page. A user profile associated with the brand page may include information about the entity itself, providing users with background or informational data about the entity.

The object store 215 stores objects describing content associated with the social networking system 100. Objects stored in the object store 215 may include various types of content, such as pages (e.g., fan pages or brand pages), events, groups, applications, general postings or comments, brand objects, entities, abstract ideas, articles, etc. Additional types of content described by an object include text, images, videos, audio files, software applications, metadata, etc. For example, an object may be a fan page for a particular television set manufacturer.

In one embodiment, types associated with objects and/or types associated with actions associated with an object may be defined by the social networking system 100 and/or by the external systems 203. For example, an external system 203 defines a news article type object and also defines that social networking system users perform "read" type actions when interacting with a news article type object. As another example, an external system 203 defines a video type object and also defines that social networking system users perform "watch" or "view" type actions on the object. Additional details regarding the definition of objects and/or actions by an external system 203 are described in U.S. patent application Ser. No. 13/239,340, filed on Sep. 21, 2011, which is hereby incorporated by reference in its entirety.

The object store 215 may store each object as a suitable structure including data describing the object. Example data describing an object includes: one or more identifiers for the object, one or more identifiers for a user account that owns or administers the object, content (e.g., text, images, links, etc.) associated with the object, information describing a relationship with other objects, identification of related objects, classification information for the object (e.g., a category to which the subject matter of the object relates, such as coffee, electronics, etc.), type information for the object (e.g., group type, event type, fan page type, article type, etc.), types of actions that may be performed on the object, and/or any other suitable information.

The interaction data store 220 tracks and stores user actions (also referred to as user interactions) performed via the social networking system 100 or via one or more external systems 203 that communicate information to the social networking system 100. Users may interact with various objects on the social networking system 100, including commenting on posts, sharing links, checking-in to locations via a mobile device, accessing content items, or other interactions. Additional examples of interactions with objects on the social networking system 100 stored in the interaction data store 220 include commenting on a photo album, communicating messages between users, becoming a fan of a musician, adding an event to a calendar, joining a group, becoming a fan of a fan page, creating an event, authorizing an application, using an application, and engaging in a transaction. Additionally, the interaction data store 220 stores user interactions with advertisements on the social networking system 100 as well as other applications operating on the social networking system 100. In some embodiments, data from the interaction data store 220 is used to infer interests or preferences of the user, augmenting the interests included in the user profile and allowing a more complete understanding of user preferences.

The interaction data store 220 may also store user actions performed on objects via an external system 203. For example, the interaction data store 220 stores information identifying a user that has "read" a news article served by a third party website. As another example, the interaction data store 220 may store information regarding a user that has "listened" to a song provided by a music streaming service. This allows the interaction data store 220 to maintain information about actions performed by social networking system users external to the social networking system 100. Additionally, storing actions performed via an external system 203 allows the interaction data store 220 to include customized actions defined by the external system 203. In one embodiment, information defining different types of customized actions associated with the external system 203 may also be stored in the interaction data store 220.

The edge store 225 stores information describing connections between users and other users and/or objects in the social networking system 100. Data describing these connections are stored as edges in the edge store 225. Some edges may define explicit associations, such as connections between users and other users or between users and objects. Different connections may have different types. For example, a user may establish a fan type connection or relationship with a brand page of a particular brand, and the connection is stored as an edge in the edge store 225. Other edges may define implicit associations between users and other users or objects. For example, a user may express a preference for ("like") a comment posted by an entity on a brand page of the entity that is stored as an edge in the edge store 225. Multiple connections between a user and a specific object may be recorded in a single edge stored in the edge store 225; alternatively, each connection is stored as a separate edge.

Additional data describing edges may be stored in the edge store 225, such as an affinity score. An edge's affinity score may be computed by the social networking system 100 over time to approximate a user's affinity for a particular object or user. The affinity score may be based on interactions performed by the user and/or number of connections between the user and an object or other user. In one embodiment, a greater number of positive interactions between a user and an object results in a larger affinity score associated with the edge between the user and the object. Computation of affinity is further described in U.S. patent application Ser. No. 12/978,265, filed on Dec. 23, 2010, which is hereby incorporated by reference in its entirety.

The data logger 240 receives information about user interactions internal to and/or external to the social networking system 100 and populates the interaction data store 220 with information describing the user interactions. Examples of interactions include: adding a connection to another user, sending a message to another user, uploading an image, reading a message from another user, viewing content associated with another user, attending an event, or other suitable actions between a user and an object or another user. Hence, interactions by a social networking system user are identified by the data logger 240 and are stored in the interaction data store 220. Additionally, the data logger 240 may store and/or update edges in the edge store 225 based on the user interactions.

The story engine 145 retrieves data from the edge store 225 and from the interaction data store 220 to generate story units for presentation to a viewing user. A story unit describes actions performed by additional users connected to the viewing user. In one embodiment, the story engine 145 selects specific configurations for generated story units to more effectively communicate content to users and to encourage user interaction. A configuration for a story unit may be based on the type of the story unit and on A-B testing results for the type of the story unit. For example, different configurations of story units having the same type (e.g., story units describing "read" type actions) are presented to different users. For example, an initial configuration is used to present story units having a particular type to a set of users and an alternative configuration is used to present additional story units having the particular type to an additional set of users. User interactions with the presented story units are analyzed and used to select a specific or default configuration for presenting subsequent story units of the same type, as further described below in conjunction with FIG. 3.

The web server 250 links the social networking system 100 via the network 204 to one or more of the client devices 202, as well as to one or more external systems 203. The web server 250 may include a mail server or other messaging functionality for receiving and routing messages between the social networking system 100 and the client devices 202 or external systems 203. The messages may be instant messages, queued messages (e.g., email), text and short message service (SMS) messages, or may be any other suitable messaging technique. In one embodiment, the web server 250 receives user requests for content and sends a request for stories to present to a user to the story engine 145.

Selecting a Configuration for a Story Unit

Figure 3:
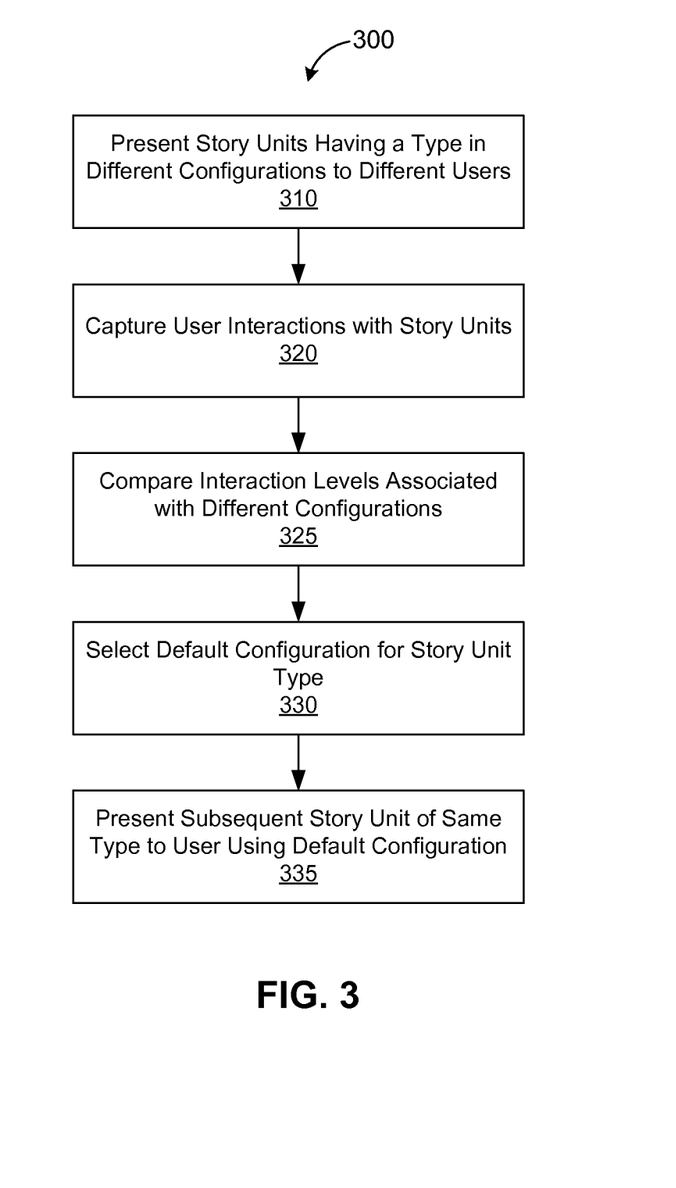
FIG. 3 is a flow chart of a process for selecting a configuration for presentation of a story unit, in accordance with an embodiment of the invention.

FIG. 3 illustrates a flow chart of one embodiment of a process 300 for selecting a configuration for a story unit. Other embodiments may perform the steps of the process 300 in different orders and may include different, additional and/or or fewer steps. The process 300 may be performed by any suitable component, such as by the story engine 145.

In one embodiment, the story engine 145 selects a default configuration for a particular type of story unit based on A-B testing. To perform the A-B testing, the story engine 145 presents 310 story units having the type to groups of viewing users of the social networking system 100. Stories in a presented story unit of the type may have one or more common or similar characteristics. For example, each story in a story unit having a "read" type may describe a "read" action performed by a user. As another example, each story in a story unit may involve an action associated with a particular external system 203.

In one aspect, one or more of the story units having the particular type are presented 310 to an initial group of viewing users in an initial configuration. A story unit presented 310 to a viewing user from the initial group of users includes stories describing actions performed by one or more users connected to the viewing user. For example, a story unit describes one or more "read" type actions performed by users connected to a viewing user. One or more story units having the same type are also presented 310 to an additional group of users in an alternative configuration. For example, story units of the particular type are presented 310 to the initial group of users in a thumbnail configuration while story units of the particular type are presented to the additional group of users in a list configuration. Hence, story units including stories having a common characteristic are presented to different groups of users in different configurations.

In one aspect, the specific configuration used for a story unit of a particular type to be presented 310 to an individual viewing user may be selected in any suitable manner. In one embodiment, the story engine 145 randomly or pseudo-randomly selects the configuration. For example, the story engine 145 generates a hash value by applying a hash function to a unique identifier associated with the viewing user. The story engine 145 then presents 310 the story unit to the viewing user using the initial configuration if the hash value is within a first value range or set of ranges, and presents 310 the story unit to the viewing user via the alternative configuration if the hash value is within a second value range or set of ranges.

In one aspect, a story unit presented 310 to a group of users includes one or more input elements allowing a viewing user to interact with the story unit or with individual stories included in the story unit. For example, an input element allows a viewing user to view the entirety of a story unit or a story, to express a preference for a story unit or a story (i.e., "like" the story unit or story), to share a story unit or a story with another user, to comment on a story unit or a story, to hide a story unit or a story, or to perform any other suitable interaction. Interactions between viewing users and presented story units are captured 320 by the data logger 240 and stored in the interaction data store 220. The story engine 145 may access the stored interactions to identify viewing users that interacted with the story units having the particular type, and determine the specific configurations of the story units with which the identified viewing users interacted. In one embodiment, the story engine 145 additionally identifies the specific types of interactions performed by the viewing users with respect to the story units, such "liking," commenting, hiding, and/or sharing type interactions.

Based on the captured 320 interactions, the story engine 145 compares 325 interaction levels for story units presented via the initial configuration with interaction levels for story units presented via the alternative configuration. To perform the comparison, the story engine 145 determines, for each of one or more different types of user interactions, the numbers and/or percentages of users in the initial group and in the additional group that have performed the type of user interaction with respect to the presented story units. For example, the story engine 145 may determine that 500 users in the initial group "liked" the presented story units and 640 users in the initial group "commented" on the presented story units. As another example, the story engine 145 may determine that 50% of the users in the additional group "shared" the presented story units, and 25% of the users in the additional group "liked" the presented story units.

In one embodiment, based on the numbers and/or percentages, the story engine 145 computes interaction scores for the initial configuration and for the alternative configuration. Each interaction score indicates a level of user interaction with story units presented via a particular configuration. Hence, an interaction score for the initial configuration indicates a level of user interaction for story units of the particular type presented via the initial configuration and an interaction score for the alternative configuration indicates a level of user interaction for story units of the particular type presented via the alternative configuration.

In one embodiment, different types of user interactions may be weighted differently when determining an interaction score. For example, the numbers or percentages of different types of interactions are individually weighted and combined to generate the interaction score for a configuration. In one implementation, the story engine 145 places greater weight on interactions indicating positive interactions with story units. For example, "like" type interactions may be weighted more than comment type interactions. Alternatively, different types of interactions are equally weighted.

After the interaction scores are generated, the story engine 145 compares 325 the interaction scores for the initial configuration and for the alternative configuration. Based on the comparison, the story engine 145 selects 330 a default configuration for use with subsequently presented story units having the particular type. Specifically, the configuration having the higher interaction score is selected 330 as the default configuration for subsequently presented story units having the same type. Hence, when the story engine subsequently 145 generates a story unit having the particular type at a later time, the story engine 145 presents 335 the story unit to a requesting viewing user via the default configuration. For example, the generated story unit is presented 335 by the story engine 145 in the thumbnail configuration if the selected default configuration for the type of the generated story unit is the thumbnail configuration.

By selecting 330 default configurations in the manner described, the story engine 145 is able to present 335 subsequent story units of the particular type in a configuration more likely to effectively communicate stories to users, and more likely to encourage user interaction.

In one embodiment, the story engine 145 may periodically repeat the A-B testing for the particular type of story unit using a small percentage of users, and select a default configuration for the type of story unit based on the subsequent A-B testing. In one embodiment, the default configuration for a type of story unit may be modified by a system operator, by an authorized administrator of an external system 203 associated with the type of story unit, or by any other suitable entity. For example, an administrator of a third party website may change the default configuration for a particular type of story unit associated with the website from a thumbnail configuration to a list configuration. In one embodiment, a default configuration for a type of story unit may be selected from more than two different configurations. For example, the story engine 145 presents story units of a particular type via hundreds or thousands of different configurations, and selects a default configuration for the type of story unit based on captured interactions between the users and the story units presented via the different configurations.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
using a computer hardware processor to perform steps comprising:
presenting one or more story units having a particular type to a plurality of users of a social networking system in an initial configuration, wherein a story unit includes one or more stories describing actions performed by a user of the social networking system and having a common characteristic, wherein the actions described by the one or more stories in a story unit are defined by an external system connected to the social networking system;
presenting one or more story units having the particular type to an additional plurality of users of the social networking system in an alternative configuration, the alternative configuration being different from the initial configuration;
capturing different types of interactions by more than one distinct user of the plurality of users of the social networking system with the one or more story units presented in the initial configuration;
capturing different types of interactions by the additional plurality of users of the social networking system with the one or more story units presented in the alternative configuration;
associating weights with different types of interactions performed by the plurality of users of the social networking system with the one or more story units presented in the initial configuration;
generating an interaction score for the initial configuration based on a number for each of the different types of interactions performed by the plurality of users and the associated weights;
associating weights with different types of interactions performed by the additional plurality of users of the social networking system with the one or more story units presented in the alternative configuration;
generating an interaction score for the alternative configuration based on a number for each of the different types of interactions performed by the additional plurality of users and the associated weights;
selecting a default configuration based at least in part on the interaction score for the initial configuration and the interaction score for the alternative configuration; and
presenting a story unit having the particular type to a viewing user in the selected default configuration.

2. The computer-implemented method of claim 1, wherein the interactions with the one or more story units presented in the initial configuration are selected from a group consisting of: an indication of preference for a story unit, a sharing of a story unit, a commenting on a story unit, and any combination thereof.

3. The computer-implemented method of claim 1, wherein the interactions with the one or more story units presented in the alternative configuration are selected from a group consisting of: an indication of preference for a story unit, a sharing of a story unit, a commenting on a story unit, and any combination thereof.

4. The computer-implemented method of claim 1, wherein the common characteristic is a type of action.

5. The computer-implemented method of claim 1, further comprising:

receiving a request for a story unit from a viewing user; and responsive to the request, presenting a story unit having the particular type to the viewing user in the default configuration.

6. The computer-implemented method of claim 1, further comprising determining the level of interaction between the plurality of users and the one or more story units presented in the initial configuration, wherein the level of interaction is represented by a percentage of users presented with one or more story units in the initial configuration that interacted with a story from the story units.

7. The computer-implemented method of claim 1, further comprising determining the level of interaction between the plurality of additional set of users and the one or more story units presented in the alternative configuration, wherein the level of interaction is represented by a percentage of users presented with one or more story units in the alternative configuration that interacted with a story from the story units.

8. The computer-implemented method of claim 1, wherein capturing different types of interactions by the more than one distinct user of the plurality of users of the social networking system with the one or more story units presented in the initial configuration comprises storing information describing the plurality of users of the social networking system performing the defined actions on the one or more story units via the external system.

9. The computer-implemented method of claim 1, wherein capturing different types of interactions by the additional plurality of users of the social networking system with the one or more story units presented in the alternative configuration comprises storing information describing the additional plurality of users of the social networking system performing the defined actions on the one or more story units via the external system.

10. A computer-implemented method comprising:

using a computer hardware processor to perform steps comprising:

receiving a story request from a viewing user of a social networking system;

generating a story unit including a plurality of stories describing actions performed by one or more additional users of the social networking system connected to the viewing user, the story unit having a particular type determined from a characteristic common to each of the plurality of stories, the actions performed by the one or more additional users being defined by an external system connected with the social networking system;

determining an interaction score for an initial configuration based on user interactions with previously presented story units using the initial configuration, wherein determining the interaction score for the initial configuration comprises:

associating weights with different types of interactions performed by more than one distinct user of the social networking system with the one or more story units presented in the initial configuration;

generating the interaction score for the initial configuration based on a number for each of the different types of interactions performed by the users of the social networking system and the associated weights;

determining an interaction score for an alternative configuration based on user interactions with previously presented story units using the alternative configuration, wherein determining the interaction score for the alternative configuration comprises:

associating weights with different types of interactions performed by additional users of the social networking system connected to the viewing user with the one or more story units presented in the alternative configuration; and generating the interaction score for the alternative configuration based on a number for each of the different types of interactions performed by the additional users of the social networking system and the associated weights;

selecting a default configuration based at least in part on the interaction score for the initial configuration and the interaction score for the alternative configuration; and presenting the generated story unit to the viewing user using the selected configuration.

11. The computer-implemented method of claim 10, wherein the characteristic common to each of the plurality of stories includes describing a same type of action.

12. The computer-implemented method of claim 10, wherein the characteristic common to each of the plurality of stories includes an association with a same external system.

13. The computer-implemented method of claim 10, wherein the story unit includes one or more images associated with the plurality of stories.

14. The computer-implemented method of claim 13, wherein the one or more images are arranged based on the selected configuration.

* * * * *